(12) United States Patent
Van Der Maas

(10) Patent No.: US 11,256,498 B2
(45) Date of Patent: Feb. 22, 2022

(54) NODE, A VEHICLE, AN INTEGRATED CIRCUIT AND METHOD FOR UPDATING AT LEAST ONE RULE IN A CONTROLLER AREA NETWORK

(71) Applicant: NXP B.V., Eindhoven (NL)

(72) Inventor: Marno Herman Josephus Van Der Maas, Eindhoven (NL)

(73) Assignee: NXP B.V., Eindhoven (NL)

( * ) Notice: Subject to any disclaimer, the term of this patent is extended or adjusted under 35 U.S.C. 154(b) by 116 days.

(21) Appl. No.: 16/014,916

(22) Filed: Jun. 21, 2018

(65) Prior Publication Data

US 2019/0026103 A1    Jan. 24, 2019

(30) Foreign Application Priority Data

Jul. 24, 2017   (EP) ..................................... 17182764

(51) Int. Cl.
*G06F 8/654*       (2018.01)
*G06F 11/07*       (2006.01)
*G06F 8/65*        (2018.01)
*H04L 12/40*       (2006.01)
*H04L 29/06*       (2006.01)
*H04L 29/08*       (2006.01)

(52) U.S. Cl.
CPC ............... *G06F 8/654* (2018.02); *G06F 8/65* (2013.01); *G06F 11/0784* (2013.01); *H04L 12/40* (2013.01); *H04L 63/20* (2013.01); *H04L 67/12* (2013.01); *H04L 67/34* (2013.01); *H04L 2012/40215* (2013.01)

(58) Field of Classification Search
CPC ........ G06F 8/65; G06F 8/654; G06F 11/0784; H04L 63/20; H04L 12/40; H04L 2012/40215; H04L 67/12; H04L 67/34
USPC ........................................... 717/168; 710/106
See application file for complete search history.

(56) References Cited

U.S. PATENT DOCUMENTS

| 2015/0029987 | A1* | 1/2015 | Addepalli et al. ...... H04L 67/12 370/329 |
| 2016/0371077 | A1 | 12/2016 | Moeller et al. |
| 2016/0381055 | A1* | 12/2016 | Galula et al. ........... H04L 67/12 726/23 |

(Continued)

FOREIGN PATENT DOCUMENTS

| EP | 3133774 A1 | 2/2017 |
| KR | 20130022688 A | 3/2013 |

*Primary Examiner* — Wei Y Zhen
*Assistant Examiner* — Mohammed N Huda

(57) ABSTRACT

A first node for updating at least one security rule in a controller area network, CAN, having a CAN bus and a host processor, is described, The first node includes: a transceiver configured to transmit and receive messages on the CAN bus; a CAN controller operably coupled to the transceiver and configured to determine an identifier (ID) contained with received messages; and a memory configured to contain a list of IDs of at least one second node that the first node is allowed to transmit messages to and/or receive messages from. The memory includes a privileged node ID configured to identify, and associated solely with, the first node and the CAN controller is configured to generate at least one CAN security rule update message to be sent to the at least one secondary node in the CAN that updates at least one security rule employed by the at least one secondary node in the CAN.

14 Claims, 5 Drawing Sheets

(56) References Cited

U.S. PATENT DOCUMENTS

| | | |
|---|---|---|
| 2017/0093659 A1 | 3/2017 | Elend et al. |
| 2017/0093866 A1* | 3/2017 | Ben-Noon et al. ..... H04L 67/12 |
| 2017/0192770 A1 | 7/2017 | Ujiie et al. |
| 2017/0235698 A1 | 8/2017 | van der Maas |
| 2017/0255459 A1* | 9/2017 | Tanimoto et al. ........ G06F 8/65 |

* cited by examiner

NODE, A VEHICLE, AN INTEGRATED CIRCUIT AND METHOD FOR UPDATING AT LEAST ONE RULE IN A CONTROLLER AREA NETWORK

CROSS-REFERENCE TO RELATED APPLICATIONS

This application claims the priority under 35 U.S.C. § 119 of European Patent application no. 17182764.5, filed on Jul. 24, 2017, the contents of which are incorporated by reference herein.

FIELD OF THE INVENTION

This invention relates to a node, a vehicle, an integrated circuit and a method for updating at least one Controller Area Network (CAN) security rule, and in particular, for updating the CAN identifier list non-cryptographically.

BACKGROUND OF THE INVENTION

The Controller Area Network (CAN) is a serial communications protocol that can efficiently support distributed real time control with a high level of reliability. CAN applications can range from high speed networks to low cost multiplex wiring. A CAN bus is a message-based communications bus protocol that is often used within automobiles. The CAN bus protocol is used to enable communications between various electronic control units (ECUs), such as an engine control module (ECM), a power train control module (PCM), airbags, antilock brakes, cruise control, electric power steering, audio systems, windows, doors, mirror adjustment, battery and recharging systems for hybrid/electric cars, and many more. The data link layer of the CAN protocol is standardized as International Standards Organization (ISO) 11898.

One growing concern with in-vehicle networks, such as in-vehicle networks that use the CAN bus protocol, is network security. At present, it is possible for a rogue device connected to an ECU to be able to read messages that are routed on the CAN bus but not meant for that ECU, and perhaps perform rogue operations through the CAN bus network. Thus, it is important and desirable to add increased security to an in-vehicle network, with one known approach being to employ cryptographic techniques. However, cryptographic techniques require a key management system and also hardware acceleration in order to adhere to real time constraints.

In contrast, non-cryptographic countermeasures are also known and work well if the manufacturer accepts that these rules can be only programmed once, without incurring the high costs of relying on real-time cryptographic countermeasures. The use of non-cryptographic countermeasures, in order to counteract potential rogue attacks, have started to be developed for CAN transceivers operational on a CAN bus, such as message killing on the CAN bus, filtering transmission and limiting a rate of transmission. An additional non-cryptographic countermeasure describes filtering of reception in the transceiver. For these non-cryptographic countermeasures to work, there needs to be a list of node identifiers (IDs), or a bandwidth setting in the case of rate limiting. With a filtering transmission approach, the CAN transceiver has a list of node IDs that the host is allowed to send to, and refuses to send any ID outside of that list. This provides some protection against a compromised host attempting to spoof another node or tamper with messages on the CAN bus. With a filtering reception in the transceiver approach, there is an ID list that indicates those messages that the host is allowed to receive. So, if a message is received from the CAN bus with an ID not on this list, the transceiver can discard this message. This provides some protection against a compromised host sharing all the messages that are present on the CAN bus. With a limiting transmission rate approach, the CAN transceiver can also be used to limit the amount of bandwidth that its host is allowed to occupy on the CAN bus. For example, the CAN transceiver can limit the amount of messages per unit time. This provides some protection against denial of service attacks in the form of flooding. Finally, the approach to support message killing on the CAN bus is the only countermeasure that is not based on the concept that there is a CAN transceiver between a compromised host and the CAN bus. This countermeasure has a list of identifiers in the transceiver that belong to that node, but now monitors the CAN bus to determine whether (or not) other nodes are using these identifiers. This countermeasure provides some protection against other nodes spoofing identifiers in this list by publishing an error on the CAN bus if it does occur.

However, the inventor of the present invention has recognised and appreciated that the known non-cryptographic countermeasures that require a list of identifiers in order to work are inflexible, in that the node IDs need to be programmed at start-up. In particular, the inventor of the present invention has recognised and appreciated that the known non-cryptographic countermeasures do not contemplate or provide any teaching of a mechanism to update these security rules or identifier lists, or bandwidth settings, or support any opportunity to update the security rules that form the basis of the non-cryptographic (security) countermeasures.

At first glance, it may appear that a design may just propose to update the security rule or identifier list via the host. However, a skilled person will appreciate that this approach undermines the purpose of the non-cryptographic countermeasures, other than message killing, since those non-cryptographic countermeasures protect against a compromised host and therefore implicitly do not trust the host. Therefore, a skilled person would typically resort to a use of cryptographic algorithms in order to provide authentication and integrity when programming 'new rules' into the CAN transceiver. Clearly, this removes the benefit from using non-cryptographic countermeasures.

Therefore, the inventor of the present invention has recognised and addressed a need to update security countermeasures in a transceiver by non-cryptographic means, and in particular update a node ID list.

SUMMARY OF THE INVENTION

The present invention provides a node with a host processor and transceiver circuit for updating at least one security rule on a Controller Area Network (CAN), an integrated circuit and a method for updating at least one security rule (e.g. one or more CAN rules), such as an identifier list on a CAN, as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

Examples of the invention are directed to CAN transceivers that implement non-cryptographic security countermeasures, such as filtering transmission and reception, or limiting rate of transmission, or message killing on the CAN bus, whereby the CAN transceivers are able to benefit from a non-cryptographic means to update one or more security rules on which they operate. Although examples of the invention are described with reference to updating one or more security rules with relation to updating the identifier list, it is envisaged that other examples of the invention may be employed with updating any security-related rule, such as updating a message rate that each node is allowed to transmit messages. It is envisaged that other examples of the invention may be employed with updating any limits applied to the data size of the packets that each node is allowed to send. It is envisaged that other examples of the invention may be employed to update any aspect or physical attribute or timing of the CAN frame. It is envisaged that other examples of the invention may be employed with updating whitelist or blacklists for one or more nodes on the CAN. It is envisaged that the term 'security rule' encompasses all such rules that relate to maintaining security within the CAN.

Examples of the invention introduce a new node, or re-allocate/re-program an existing CAN node, to function as a privileged CAN transceiver that has a privileged unique CAN ID that is recognized by each other CAN transceiver on the CAN. In this manner, only the 'privileged' node on the CAN is configured to be the node that is able to transmit a message that includes the CAN privileged node ID. Thereafter, the privileged node is able to transmit a message that includes the privileged node ID and a recipient node's unique ID to update the security rules individually in that recipient node to be employed by the CAN transceiver in that recipient node. In examples of the invention, no other node in the network is able to send a security rules update message (for example due to prevention by means of transmission filtering employed in those nodes on the network, and through identifying that the node is not allowed to transmit a message using an alternative node ID, such as the privileged node ID). In some examples, the privileged node may be configured to kill any such message that has used (e.g. spoofed) the privileged node ID.

Figure 3:
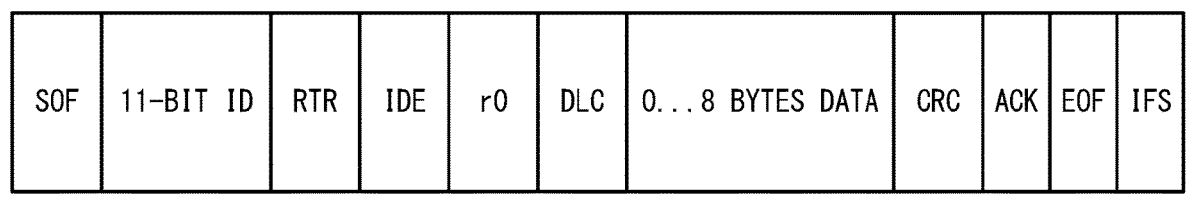
FIG. 3 illustrates an example of a bus frame, such as a CAN frame employed in accordance with example embodiments of the invention.

CAN messages sent over a CAN network bus include an identifier, control bits and a payload, as illustrated in more detail in FIG. 3. In some examples of the invention, the privileged CAN ID employed by the privileged CAN node or transceiver may be also used to identify a particular message type, for example indicating to the receiving nodes that the CAN message is an 'update' message. In some examples, the privileged node is also configured to employ at least one of: 'filtering transmission', 'message killing' countermeasures, described in the background section, together with the other CAN nodes/transceivers, to ensure that only the privileged node (with the privileged CAN ID) is able to send CAN messages with this privileged ID. In this manner, the use of the privileged ID is recognized as only being allowed to be used by the privileged node itself.

In some examples, the ID list update mechanism assumes that all nodes on the network are behind a secure CAN transceiver, and at the very least that the privileged node is inaccessible by direct means by a rogue node or perpetrator. However, if we assume a possibility of remote logical attacks, which is also what the security countermeasures in the known art protect against, then the herein described examples of a countermeasure update mechanism provides a further degree of security without requiring cryptography.

In some examples, it is envisaged that alternative ways to instruct the privileged node that an update has taken place. For example, the privileged node may be connectable to the internet or the privileged node may be accessible locally by a monitoring device, say operated by a car mechanic or shop that informs the privileged node of implemented security update features.

In some examples, it is also envisaged that in order to minimize risk, it is also possible to appoint multiple privileged nodes with different rules that they can respectively update. In this example, each privileged node is associated with having a respective privileged node ID, wherein the privileged node ID of the first node is configured to update at least one security rule (or at least one security rule type) that the other privileged nodes are precluded from updating. For example, in one privileged node may be configured to update transmit IDs, but not receive IDs and another privileged node may be configured to update the receive IDs, but not the transmit IDs. A yet further example is envisaged whereby one privileged node may be configured to update one (first) half of the CAN nodes, but not the other (second) half, and the other privileged node may be configured to update the other (second) half of the CAN nodes, but not the first half. It is envisaged that this example may be extended to three or more privileged nodes, with each one of them having their own unique privileged CAN ID. In this manner, should one of the privileged nodes be compromised then, advantageously, the attacker may not be able to disable all of the security features at once.

In a first aspect of the invention, a first node, otherwise herein referred to as a privileged node, is described for updating at least one security rule in a controller area network (CAN), having a CAN bus, and a host processor. The first node includes a CAN transceiver configured to transmit and receive messages on the CAN bus; a controller (e.g. a CAN controller) operably coupled to the CAN transceiver (or contained within the CAN transceiver, as shown) and configured to determine an identifier (ID) contained with received messages; and a memory operably coupled to the controller and configured to contain at least one of: a list of IDs, at least one security rule parameter of at least one second node that the first node is allowed to transmit messages to and/or receive messages from. The first node memory includes a privileged node ID configured to identify, and associated solely with, the first node. The controller is configured to generate and send at least one security rule(s) update message to the at least one secondary node in the CAN that updates at least one security rule employed by the at least one secondary node in the CAN. In this manner, updates to security rules employed by nodes in the CAN may be configured by the first/privileged node, as the remaining nodes in the CAN recognise that security rules update messages are only received from the privileged node, identified by the privileged node ID.

In some examples, the at least one update message security rule may include a non-cryptographic update of a CAN identifier list. In this manner, a non-cryptographic update of a CAN bus identifier list throughout the whole of the CAN may be supported. In some examples, the security rules update message may include a non-cryptographic update of at least one of: a message rate that each node is allowed to transmit message, a limit applied to a data size of data packets that each node is allowed to send, a physical attribute or timing of a bus frame. In some examples, in response to the transceiver receiving a message on the CAN bus and the (e.g. CAN) controller determining the received message comprises the privileged node ID, the (e.g. CAN) controller may be further configured to kill the received message on the CAN bus, whereby the message killing is performed by publishing an error on the CAN bus that can be read by everyone on the bus. In some examples, the (e.g. CAN) controller may be further configured to transmit an error message on the CAN bus that are seen by every node on the bus and cannot be addressed to a specific node on that bus, such that the error message identifies a presence of a rogue node. In this manner, the privileged node is able to determine a presence of a rogue node impersonating itself and invalidate messages coming from that rogue node by publishing an error on the bus, where the error message published on the bus may identify a presence of a rogue node.

In some examples, the CAN messages sent over the CAN bus by the first node may include the privileged node ID, an identifier of an intended recipient of a message, at least one control bit and a data payload, wherein the data payload is configured to identify a security rules update message type. In some examples, a first number of bytes of the data payload may be configured as the ID of the intended recipient node. In some examples, the data payload may further include a parameter that identifies a start location and a stop location of an update sequence of the rules update message, the start location and stop location being interspersed by the ID of the intended recipient node that identifies the message as a filtering rules update message for the identified second node. In this manner, the known CAN message format may be adapted to support a use of real-time rules updating messages within the CAN, as generated by the first, privileged node.

In some examples, the privileged node ID may be configured to be identifiable to a plurality of secondary nodes in the CAN, as being associated with the privileged node that is authorised to update at least one security rule therein. In some examples, the first node may be a re-programmed second CAN node, with the first node re-programmed with the privileged node ID and identifier list that identifies all other nodes on the CAN bus that implement CAN rules.

In a second aspect of the invention, a vehicle comprising the first node of the first aspect is described. In a third aspect of the invention, an integrated circuit comprising the controller and memory of the first node of the first aspect is described. In some examples, the integrated circuit comprising the controller and memory may be coupleable to a separate transceiver integrated circuit.

In a fourth aspect of the invention, a method for updating at least one security rule in a controller area network, CAN, having a CAN bus and a host processor. The method includes, at a first node: storing in a memory a list of identifiers, IDs, of at least one second node in the CAN that the first node is allowed to transmit messages to and/or receive messages from; and transmitting and receiving messages on the CAN bus. The method further includes storing in a memory a privileged node ID configured to identify, and associated solely with, the first node; and generating at least one CAN security rule update message to be sent to the at least one second node in the CAN that updates at least one security rule employed by the at least one second node in the CAN.

Figure 1:
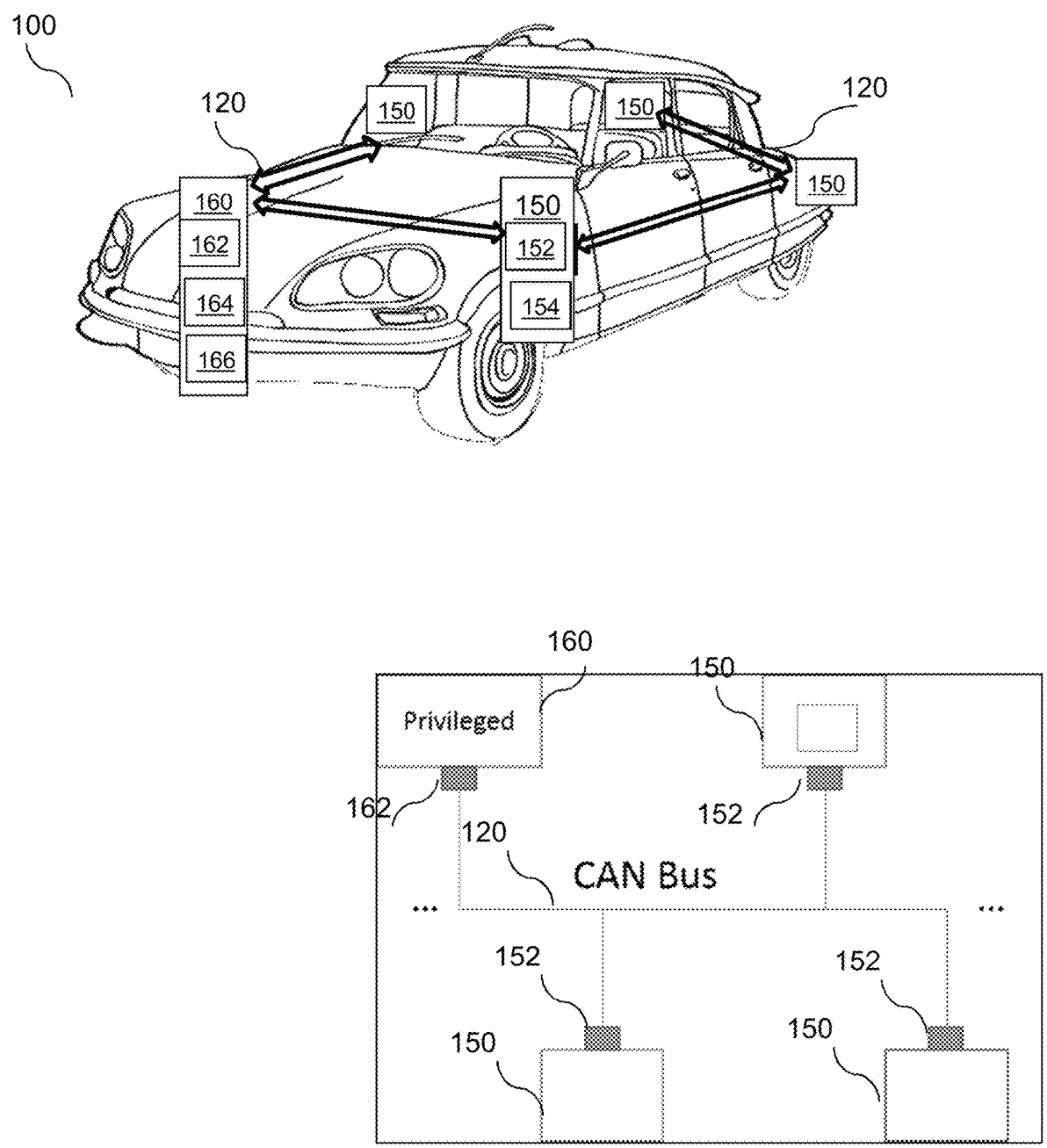
FIG. 1 illustrates a vehicle that employs a bus network, such as a Controller Area Network (CAN) bus, adapted in accordance with example embodiments of the invention.

Referring now to FIG. 1, a simplified diagram of a vehicle 100 that employs a bus network, such as a Controller Area Network (CAN) bus 120, is illustrated in accordance with example embodiments of the invention. The CAN bus 120 connects a number of electronic units, referred to as nodes 150, each node having a respective CAN transceiver 152 and CAN microcontroller 154. In this example, and in accordance with embodiments of the invention, one of the nodes has been re-configured (or introduced) as a 'privileged node' 160, with its own CAN transceiver 162 and CAN host processor or microcontroller, hereafter referred to as CAN controller 164. In other examples, it is envisaged that privileged node 160 may be a remote device that can be coupled to the CAN bus 120 via an on-board diagnostics (OBD) port.

In examples of the invention, a first node, otherwise herein referred to as a privileged node 160, is configured to update at least one security rule in the CAN. The privileged node 160 includes a transceiver 162 configured to transmit and receive messages on the CAN bus; and at least a CAN controller 164 operably coupled to the transceiver 162 and configured to determine an identifier (ID) contained within received messages. A memory is operably coupled to the CAN controller 164 and configured to contain at least one of: a list of IDs, at least one security rule parameter of at least one second node 150 that the privileged node 160 is allowed to transmit messages to and/or receive messages from. A privileged node ID is stored in memory labeled as 166 in the transmit whitelist and associated solely with, the privileged node 160. The CAN controller 164 is configured to generate and send at least one security rule(s) update message to the at least one secondary node 150 in the CAN that updates at least one security rule employed by the at least one secondary node 150 in the CAN. In this manner, updates to security rules employed by nodes in the CAN may be configured by the privileged node 160, as the remaining nodes in the CAN recognise that rules update messages are only received from the privileged node 160, as identified by the privileged node ID.

A classical CAN messages is constructed with the following parts: an Identifier (of 11 or 29 bits), control bits, data (0-8 bytes), cyclic redundancy check (of 15 bits), an acknowledgement field and an end of frame. Examples of the invention may be applied with the privileged ID accepting an 11 or 29 bit ID. A security rules update mechanism, for example to update an ID list, needs to use CAN messages from the privileged node that is sent to the node that needs to update its security rules, e.g. its ID list. One example format of a CAN message employed by a privileged node is identified in Table 1 below.

TABLE 1

| | CAN frame part | | |
|---|---|---|---|
| | CAN Identifier | Data payload | |
| Value | Privileged ID | Node ID | parameter |
| Size | 11 or 29 bits | 4 bytes | ≤4 bytes |

Here, the data payload of the message type with the privileged ID is re-configured to include the node ID of the intended recipient of the message and a parameter field, which in some examples may be a security rules update message. In this example, the first 4 bytes of the data payload are set to be the ID that defines the destination (intended recipient) node 150. The parameter is used to identify the start and stop of the update sequence and in between the start and the stop value it specifies the destination node 150, which identifiers it needs to put into its filtering rules. In other examples, a different format or different number of bytes per field may be used, for example dependent upon the application or number of CAN transceivers employed in the system.

One example of how this example message format may be used to update one or more security rules parameter(s) or an ID list is as follows. A number of distinct CAN messages for the privileged node 160 may be generated according to the aforementioned format. The CAN ID is always the privileged ID and the first part of the data payload is always the node ID of the intended recipient. The privileged node 160 only changes the parameter field to specify a new message (or security rules update) for the receiving node to adopt.

In one example, the privileged node 160 may define a start and a stop value for the parameter field for example. Start=0x00000001 and stop=0x00000003. In between the start value and the stop value, the parameter may be equal to the CAN ID shifted into the most significant 11 or 29 bits and with the two least significant bits set to zero.

Thus, an example sequence of messages is illustrated in message list 1, where ||0* indicates that the remainder of the least significant bits (LSBs) is filled with zeroes:
Message List-1:
  Privileged ID: Node ID, 0x00000001
  Privileged ID: Node ID, $ID_1$||0*
  Privileged ID: Node ID, $ID_2$||0*
  . . .
  Privileged ID: Node ID, $ID_n$||0*
  Privileged ID: Node ID, 0x00000003
Where: $ID_1$ through $ID_n$ represent the new identifier list to be used.

In some examples the start value may also be used to specify which countermeasure approach is being updated. For example, 0x00000001 may be used to indicate that the filtering transmission rule is being updated, whereas 0x00000011 may be used to indicate that the filtering reception rule is being updated, whereas 0x00000021 may be used to indicate that the limiting transmission rate rule is being updated, and so on, so long as one of the last two least significant bits in this example is non-zero. In these examples, the Node ID defines the destination node 150, which is the node that the privileged node is addressing with the update sequence.

Again, an important facet to this rules update feature, which in some examples includes an ID list update, is that no other node except for the privileged node 160 is able to send messages with this privileged ID, by means of, for example, a transmission refusal. Also, in some examples, the privileged node 160 is configured to monitor the CAN bus 120 to determine whether (or not) the privileged ID is being misused by a rogue device, and kill those messages if such a determination is made. Such message killing even prevents the easiest of physical attacks, such as attaching a dongle to the on-board diagnostics (OBD) port. Additionally, the security of the entire system relies on the security of the privileged node, so in some examples this security of the privileged node 160 is isolated from the rest of the CAN bus 120. Advantageously, it is a lot less expensive and more manageable to secure one node well, such as the privileged node 160, than having to secure every single node (150, 160) in a network.

In this example, the CAN transceivers 152 of standard nodes refuse to send any message that includes the privileged node ID. Additionally, the CAN transceiver 162 of the privileged node 160 is configured to kill any message that it determines is trying to spoof the privileged ID. This way the security of the update mechanism is as secure as the privileged node 160, itself.

Although examples of the invention are described with reference to a vehicle 100 such as a car, as illustrated in FIG. 1, it is envisaged that the concepts herein described may be used by any device that uses a CAN bus, and in some examples in any road transport device, such as trucks, motorcycles, buses, etc.

Figure 2:
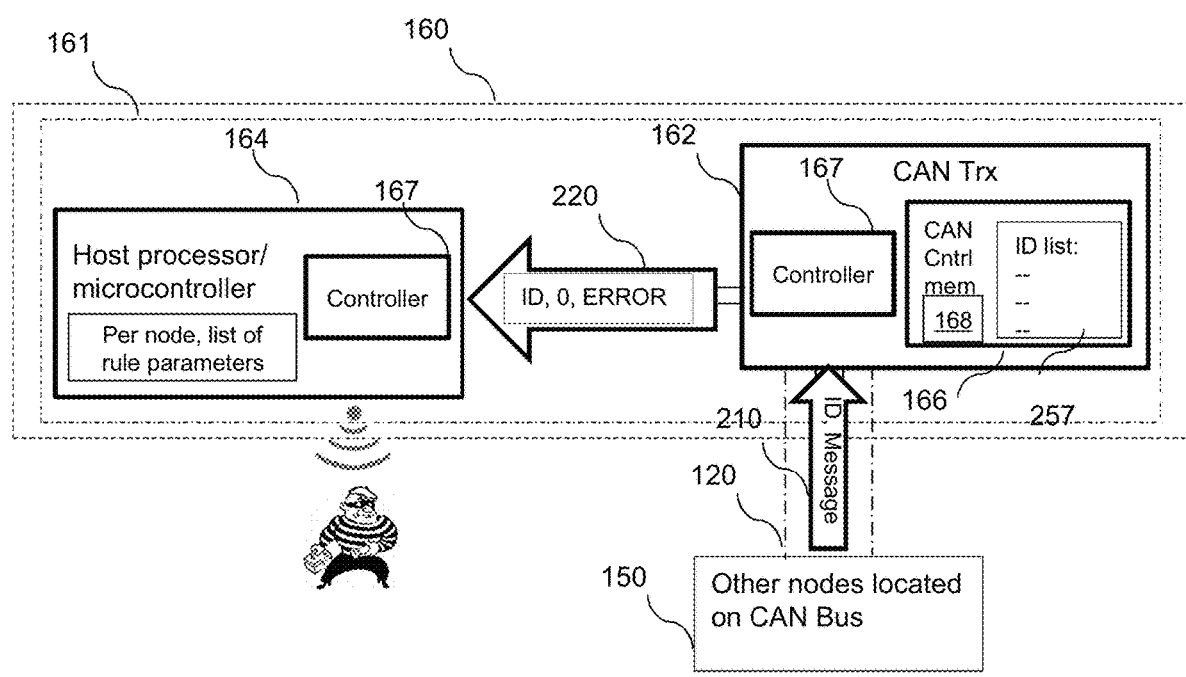
FIG. 2 illustrates an example of a CAN transceiver adapted in accordance with example embodiments of the invention.

FIG. 2 illustrates a high level overview of a CAN system 200 with a privileged node 160, adapted in accordance with example embodiments of the invention. In some examples, the privileged node 160 may benefit from some of the circuitry already implemented with known standard nodes that have been adapted to include the non-cryptographic countermeasures described earlier. In this regard, the privileged node 160 includes a CAN controller 164 that includes a controller circuit 167, which may be implemented in, or coupled to, the CAN transceiver 162. The CAN transceiver 162, as known with existing CAN transceivers 152 of standard nodes, already has the ability to distinguish the ID of received messages, as well as payload data and cyclic redundancy check (CRC) parts, etc. of received frames on the CAN bus. However, in accordance with examples of the invention, the CAN transceiver 162 is configured to be able to determine whether the privileged node's CAN controller 164 is allowed to receive an incoming message 210. If the privileged node's CAN controller 164 is not allowed to receive the incoming message 210, the CAN transceiver 162 issues an error message 220 to the CAN controller 164 to delete the message content. In examples of the invention, the error message 220 sent between the CAN transceiver 162 and the CAN controller 164 is internal to the privileged node 160, say over the transmit differential (TXD) and receive differential (RXD) pins. Furthermore, in some examples of the invention, the CAN controller 164 publishes the error message on the CAN, for example before the message end, such that the error message published on the CAN bus 120 identifies a presence of a rogue node to all other second nodes 150 located on the CAN bus.

In some examples, it is envisaged that the privileged node's host processor (or microcontroller) 164 may include the privileged node's CAN transceiver 162 (or vice versa, in that a privileged node's transceiver includes a privileged node's CAN controller 164). The privileged node includes at least one controller 167, which may be located in or near the privileged node's CAN controller 164, although in the illustrated example it may also be included in the privileged node's CAN transceiver 162. This provides the privileged node 160 with the ability to receive and process CAN messages that are addressed to the privileged node 160 itself (or addressed to the CAN transceiver 162 of the privileged node 160), instead of, say, the CAN controller 164.

Referring now to FIG. 3, an example of a bus frame, such as a CAN frame 300, employed in accordance with example embodiments of the invention, is illustrated. FIG. 3 illustrates bit fields of Standard Controller Area Network (CAN) protocol. The CAN protocol is well known, hence detail discussion of the CAN protocol is being omitted so as not to obfuscate this disclosure. SOF is the single dominant start of frame bit that marks the start of a message and is used for synchronization of the CAN nodes on the CAN bus after being idle. 11-Bit ID is the standard CAN 11-bit identifier that establishes the priority of the message. The lower the binary value, the higher is its priority. A single Remote Transmission Request (RTR) bit is dominant when information is required from another node. All nodes receive the request, but the identifier determines the specified node. The responding data is also received by all nodes and used by any node interested. A dominant single identifier extension (IDE) bit means that a standard CAN identifier with no extension is being transmitted. Reserved bit (r0) is reserved for future CAN standard amendment. The 4-bit data length code (DLC) contains the number of bytes of data being transmitted. Up to 64 bits of application data may be contained in one CAN message. A 16-bit (15 bits plus delimiter) cyclic redundancy check (CRC) contains the checksum (number of bits transmitted) of the preceding application data for error detection.

Every node receiving an accurate message overwrites this recessive bit ACK in the original message with a dominant bit, indicating an error free message has been sent. Should a receiving node detect an error and leave this bit recessive, it discards the message and the sending node repeats the message after re-arbitration. In this way, each node acknowledges (ACK) the integrity of its data. ACK is 2 bits, one is the acknowledgement bit and the second is a delimiter.

The end-of-frame (EOF) is a 7-bit field that marks the end of a CAN frame or message and disables bit-stuffing, indicating a stuffing error when dominant. When 5 bits of the same logic level occur in succession during normal operation, a bit of the opposite logic level is stuffed into the data. A 7-bit interframe space (IFS) contains the time required by a controller to move a correctly received frame to its proper position in a message buffer area.

The message format for Extended CAN is similar to Standard CAN, with a few differences. Substitute Remote Request (SRR) bit replaces the RTR bit. A recessive bit in the identifier extension (IDE) indicates that more identifier bits follow. The 18-bit extension follows IDE. Following the RTR and r0 bits, an additional reserve bit has been included ahead of the DLC bit. The embodiments described herein are applicable to both Standard and Extended CAN message formats. Bus access in CAN is event driven and takes place randomly. If two nodes try to occupy the CAN bus 120 simultaneously, access is implemented with a non-destructive, bit-wise arbitration. In this context, 'non-destructive' encompasses a scenario whereby the node winning arbitration just continues on with the message, without the message being destroyed or corrupted by another node. In some examples, the allocation of priority to messages may be contained in the identifier.

Figure 4:
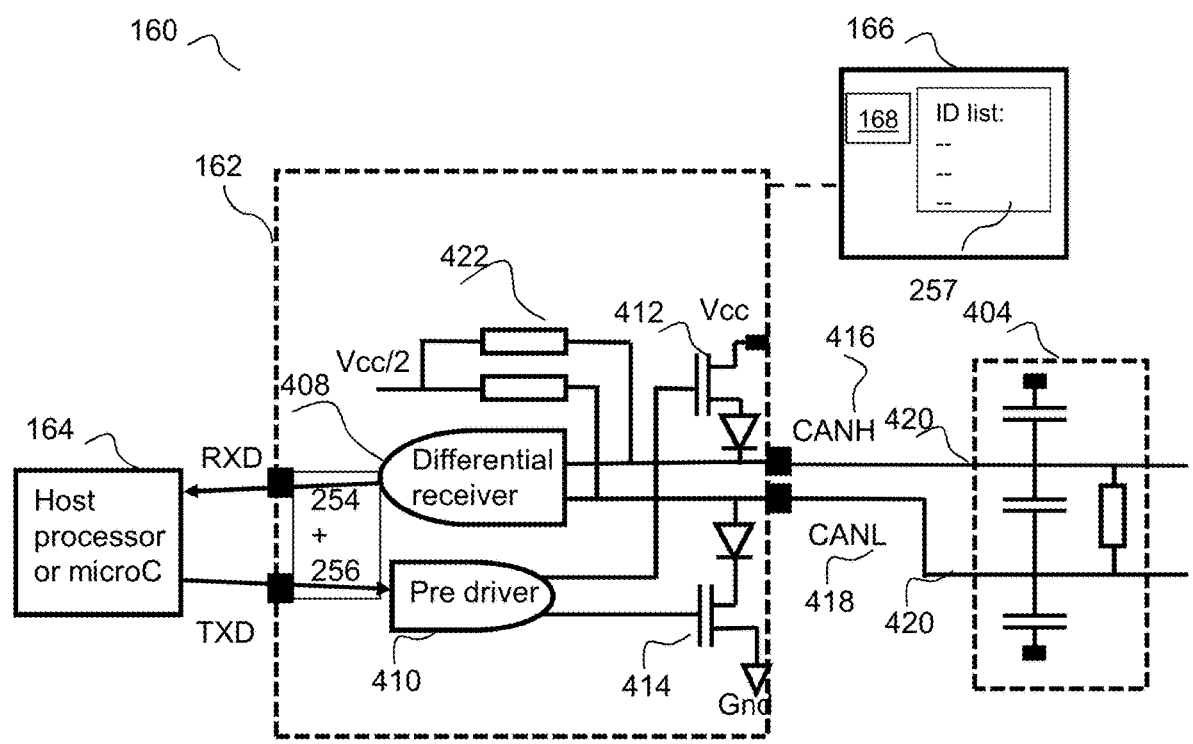
FIG. 4 illustrates a more detailed example of a CAN transceiver adapted in accordance with example embodiments of the invention.

Referring now to FIG. 4, a more detailed illustration of a CAN transceiver circuit of a privileged node 160 is shown. The privileged node 160 includes a main transceiver circuit 402, parasitic load capacitances and load resistances 404, and is coupled to a CAN controller 164 via two wires 220.

The main transceiver circuit 402 includes differential receiver 408, pre-driver 410 and transceiver circuit output driver stages 412, 414. CANH 416 and CANL 418 are differential output signals on the CAN bus 120. CAN transceivers use open-drain transceiver circuit output driver stages 412, 414, where one of the output stages 412 is connected to the supply voltage, and the other open-drain output stage 414 is connected to ground. CAN controller 164 transmits a signal to pre-driver 410 that is operable to drive open-drain transceiver circuit output stages 412, 414. Internal resistor network 422 is generally connected to approximately half the supply voltage to create a differential output bus signal on the CAN bus lines, CANH 416 and CANL 418.

If the CAN controller 164 determines that it needs to transmit a dominant bit on the CAN bus, it instructs the pre driver 410 to enable both open drain output stages 412, 414 so that they conduct, thereby producing voltage levels of typically 4.5V at CANH 416 and typically 1.5V at CANL 418. The resulting differential output voltage constitutes a dominant bit and, therefore, logic low (dominant '0'). If the CAN controller 164 determines that it needs to transmit a recessive bit on the CAN bus, it instructs the pre driver 410 to disable both open drain output stages 412, 414 so that they become high impedance and, therefore, only the Vcc/2 potential is applied via the pull-up resistors 422 to both outputs CANH 416 and CANL 418, which represents logic high (recessive '1'). The logic high phase (recessive '1') is not actively driven as in the dominant phase. Therefore, the transition time from dominant to recessive is dependent on the system passively transitioning from logic '0' to logic '1' (e.g. back to Vcc/2). The passive transition from the dominant phase to the recessive phase may increase overall transition time within the CAN bus 120, leading to a reduction of the maximum data rate that can be utilised during a CAN high bit-rate phase.

In accordance with some examples of the invention, the CAN transceiver of the privileged node has been adapted to include control logic 254 located between the differential receiver and the RXD to perform filtering and additional control logic 256 located between the TXD pin and the pre-driver 410.

In accordance with examples of the invention, the privileged node 160 includes memory 166 that includes a list of IDs 257 that it is allowed to transmit messages to, and receive messages from. Notably, in accordance with examples of the invention, the memory 166 and interaction with CAN transceiver 162 is adapted to also include any security rule parameters of the other nodes for each of the potential recipient node IDs, as well as the privilege node ID 168. In this manner, the privileged node 160 is configured as the only node on the CAN bus that is capable of updating non-cryptographic countermeasure rules. Advantageously, the remainder of the nodes in the system are also configured to recognise and respond to messages from the privileged node 160 identified by the privilege node ID 168, and in response thereto update its respective application of one or more non-cryptographic countermeasure rules, for example an ID list.

In contrast to all other node memories, the privileged node memory 166 is configured to include the privileged ID, which is programmed into the transmission list (and thus stored locally). In a similar manner to other nodes, the memory 166 is also configured to include each of the other approved transmit IDs and receive IDs of other nodes on the CAN bus 120. In some alternative examples, it is envisaged that the memory requirements of the privileged node 160 may be distributed between two (or more) different memories, so long as the portion of the memory that contains the privileged ID is located in the CAN transceiver 162 of the privileged node 160. In this example, the portion of the memory that contains the ID lists of the other nodes may be included in the CAN transceiver 162, but may equally be included in the host processor or microcontroller (e.g. CAN controller 164) of the privileged node 160.

The memory 166 is used by the privileged node 160 (as it is with other nodes on the CAN bus 120) to provide an additional level of intelligence to facilitate filtering. In this manner, a form of control mechanism exists between the CAN H 416 and CAN L 418 paths and the differential receive (RXD) and differential transmit (TXD) pins, which is able to determine the ID that is being transmitted or being received, and cross-checks this with IDs or ID lists that are located in memory 166. If the ID is not allowed to be transmitted or received, the privileged node 160 will stop the transmission or reception respectively. In this regard, the privileged node's transceiver is no different than any other transceiver, in any other node, except for the fact that the privileged ID is allowed to be sent by this node and not by any other node. The privileged node 160 further includes controller logic for performing an update sequence, such as generating and distributing the message list-1, as described above.

Figure 5:
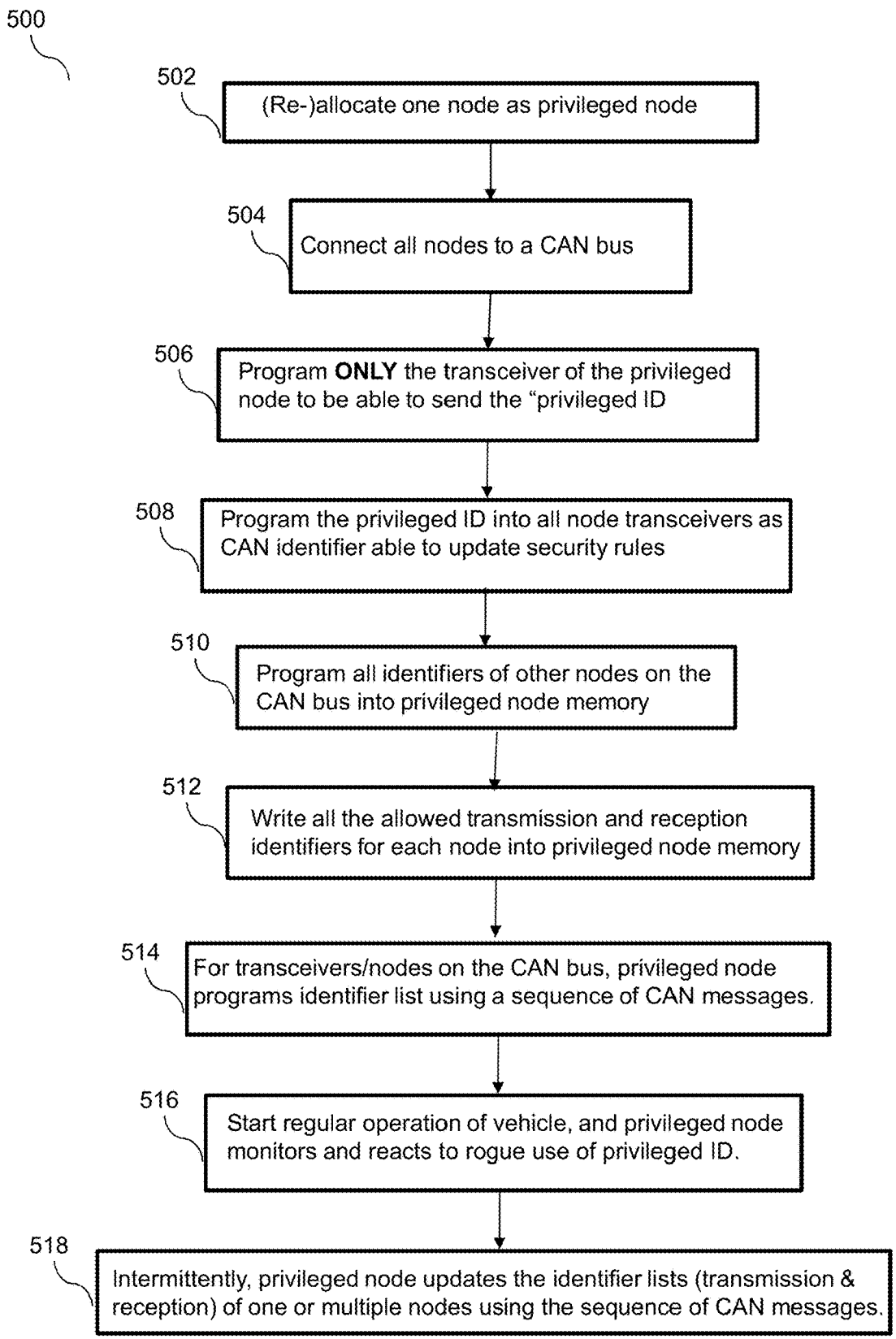
FIG. 5 illustrates an example flowchart of a method for updating a CAN identifier list, and in particular, for updating the list non-cryptographically, in accordance with example embodiments of the invention.

Referring now to FIG. 5, an example flowchart 500 illustrates a method for updating a CAN identifier list, and in particular, for updating the list non-cryptographically, in accordance with example embodiments of the invention. First, at 502, one node on the CAN bus is either re-allocated or re-programmed as a privileged node, or node configured to act as a privileged node attached to the CAN bus. At 504, all nodes including the privileged node are connected to the CAN bus. At 506, only the transceiver of the privileged node is programmed with privileged ID, such that the privileged node is the only node that is able to send the 'privileged ID.' At 508, the privileged ID is programmed into all the other transceivers and nodes on the CAN bus, with the privileged ID being recorded as the CAN identifier that is associated with updating their identifier list. Thereafter, at 510, each of the identifiers of the other nodes on the CAN bus are programmed into the memory of the memory of the microcontroller within the privileged node.

At 512, all of the allowed transmission identifiers (contained in the whitelist or blacklist) and allowed reception identifiers (contained in whitelist or blacklist) for each node are written into the memory of the privileged node. The whitelist or blacklist of allowed nodes is known and facilitates message filtering, i.e. allows messages from node identifiers on a whitelist and rejects messages from node identifiers on a blacklist. At 514, for each of the other transceivers/nodes on the CAN bus, in some examples, the privileged node is configured to program the identifier list using, for example, a sequence of CAN messages such as that described in Message List-1.

At 516, the vehicle enters its regular operation, whilst the privileged node is configured to monitor whether (or not) the privileged ID is ever used. It is envisaged, in some examples, that the privileged node may be instructed to update the identifier lists (e.g. transmission & reception IDs) of one or multiple nodes, for example using the sequence of CAN messages described in Message List-1 either physically in a shop, or alternatively be performed using remote software updates.

Because the illustrated embodiments of the present invention may for the most part, be implemented using electronic components and circuits known to those skilled in the art, details have not been explained in any greater extent than that considered necessary as illustrated above, for the understanding and appreciation of the underlying concepts of the present invention and in order not to obfuscate or distract from the teachings of the present invention.

In some examples, the circuits herein described may be implemented using discrete components and circuits, whereas in other examples the circuit may be formed in integrated form in an integrated circuit, such as the integrated circuit 161 of FIG. 1, which, in some examples, contain the circuits and components of the privileged node. Because the illustrated embodiments of the present invention may, for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

A skilled artisan will appreciate that the level of integration of processor circuits or components may be, in some instances, implementation-dependent. Furthermore, a single processor or MCU may be used in a privileged node to perform a method for updating Controller Area Network (CAN) security rules, and in particular, for updating the CAN identifier list non-cryptographically. Clearly, the various components within the privileged node 160 can be realized in discrete or integrated component form, with an ultimate structure therefore being an application-specific or design selection.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals. Those skilled in the art will recognize that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, the CAN transceiver 162 and/or privileged node's host processor or microcontroller (e.g. CAN controller 164) may be implemented as circuitry located on a single integrated circuit. Alternatively, the circuit and/or component examples may be implemented as any number of separate integrated circuits or separate devices interconnected with each other in a suitable manner. Also for example, the examples, or portions thereof, may implemented as soft or code representations of physical circuitry or of logical representations convertible into physical circuitry, such as in a hardware description language of any appropriate type.

Also, the invention is not limited to purely a vehicle, but may be employed in any device or electronic unit or node that is able to transmit or receive messages on a bus-based network, by operating in accordance with suitable program code, such as minicomputers, personal computers, tablets, embedded systems, cell phones and various other wireless devices, commonly denoted in this application as 'computer systems'. It is envisaged that the inventive concept may be employed with any bus, and is not limited to use with a CAN bus. However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one, or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A first node for updating at least one security rule in a controller area network, CAN, having a CAN bus and a host processor, wherein the first node comprises:
a transceiver configured to transmit and receive messages on the CAN bus;
a controller operably coupled to the transceiver and configured to determine an identifier contained with received messages; and
a memory operably coupled to the controller and configured to contain at least one of: a list of identifiers (IDs), at least one security rule parameter, of at least one second node that the first node is allowed to transmit messages to and/or receive messages from; wherein the first node is characterised in that the memory of the first node includes a privileged node ID configured to identify, and associated solely with, the first node, wherein the privileged node ID indicates that the first node is able to update at least one security rule employed by the at least one secondary node, and the controller is configured to generate and send at least one security rule update message to the at least one secondary node in the CAN that updates the at least one security rule employed by the at least one secondary node in the CAN.

2. The first node of claim 1, wherein the at least one security rule update message comprises a non-cryptographic update of a CAN bus identifier list.

3. The first node of claim 1, wherein the at least one security rule update message comprises a non-cryptographic update of at least one of: a message rate that each node is allowed to transmit message, a limit applied to a data size of data packets that each node is allowed to send, a physical attribute or timing of a bus frame.

4. The first node of claim 1, wherein, in response to the transceiver receiving message on the CAN bus and the controller determining the received message comprises the privileged node ID, the controller is further configured to kill the received message on the CAN bus by publishing an error message on the CAN bus before the message end, wherein the error message published on the CAN bus identifies a presence of a rogue node.

5. The first node of claim 1, wherein the messages sent over the CAN bus by the first node include the privileged node ID, an identifier of an intended recipient of a message, at least one control bit and a data payload, wherein the data payload is configured to identify a security rules update message type.

6. The first node of claim 5, wherein the first number of bytes of the data payload are configured as the ID of the intended recipient node.

7. The first node of claim 5, wherein the data payload further includes a parameter that identifies a start location and a stop location of an update sequence of the security rules update message, the start location and stop location being interspersed by the ID of the intended recipient node that identifies the message as a filtering rules update message for the identified second node.

8. The first node of claim 1, wherein the privileged node ID is configured to be identifiable to a plurality of secondary nodes in the CAN bus to update at least one security rule stored and applied therein.

9. The first node of claim 1, wherein the first node is a re-programmed secondary node, with the first node re-programmed with the privileged node ID and identifier list that identifies all other nodes on the CAN bus that implement the at least one updated security rule.

10. The first node of claim 1, wherein the first node is one of a plurality of privileged nodes, each privileged node associated having a respective privileged node ID, wherein the privileged node ID of the first node is configured to update at least one security rule that the other privileged nodes are precluded from updating.

11. A vehicle comprising the first node of claim 1.

12. An integrated circuit for a first node for updating at least one security rule in a controller area network, CAN, having a CAN bus and a host processor, wherein the integrated circuit comprises:
 a controller operably coupleable to a transceiver and configured to determine an identifier contained in messages received on the CAN bus; and
 a memory operably coupled to the controller and configured to contain at least one of: a list of identifiers (IDs), at least one security rule parameter, of at least one second node that the first node is allowed to transmit messages to and/or receive messages from; wherein the integrated circuit is characterised in that the memory of the integrated circuit includes a privileged node ID configured to identify, and associated solely with, the first node, wherein the privileged node ID indicates that the first node is able to update at least one security rule employed by the at least one secondary node, and the controller is configured to generate and send at least one security rule update message to the at least one secondary node in the CAN that updates the at least one security rule employed by the at least one secondary node in the CAN.

13. A method for updating at least one security rule in a controller area network, CAN, having a CAN bus and a host processor, wherein the method comprises, at a first node:
 storing in a memory a list of identifiers, IDs, of at least one second node in the CAN that the first node is allowed to transmit messages to and/or receive messages from; and
 transmitting and receiving messages on the CAN bus;
 wherein the method is characterised by:
 storing in a memory of the first node a privileged node ID configured to identify, and associated solely with, the first node, wherein the privileged node ID indicates that the first node is able to update at least one security rule employed by the at least one secondary node; and
 generating at least one CAN security rule update message to be sent to the at least one second node in the CAN that updates the at least one security rule employed by the at least one second node in the CAN.

14. The method of claim 13 further comprising:
 receiving a message on the CAN bus;
 determining that an identifier contained with the received message comprises the privileged node ID; and
 killing the message on the CAN bus in response thereto.

* * * * *